(12) United States Patent
Gupta et al.

(10) Patent No.: US 12,045,532 B1
(45) Date of Patent: Jul. 23, 2024

(54) SYSTEM AND METHOD FOR CONTENT DELIVERY ACROSS A HETEROGENEOUS MULTI-DISPLAY ENVIRONMENT

(71) Applicant: XOP Networks Inc., Dallas, TX (US)

(72) Inventors: Chirag Gupta, Dallas, TX (US); Sudhir Gupta, Irving, TX (US)

(73) Assignee: XOP Networks Inc., Dallas, TX (US)

( * ) Notice: Subject to any disclaimer, the term of this patent is extended or adjusted under 35 U.S.C. 154(b) by 0 days.

(21) Appl. No.: 18/362,614

(22) Filed: Jul. 31, 2023

Related U.S. Application Data

(60) Provisional application No. 63/470,871, filed on Jun. 3, 2023.

(51) Int. Cl.
G06F 3/14 (2006.01)
(52) U.S. Cl.
CPC ................... G06F 3/1446 (2013.01)
(58) Field of Classification Search
CPC .................................................... G06F 3/1446
See application file for complete search history.

(56) References Cited

U.S. PATENT DOCUMENTS

| | | | |
|---|---|---|---|
| 10,237,394 B2 | 3/2019 | Sirpal et al. | |
| 10,592,194 B2 | 3/2020 | Rakshit et al. | |
| 2008/0148184 A1 | 6/2008 | Davis | |
| 2009/0125586 A1 | 5/2009 | Sato et al. | |
| 2015/0084837 A1* | 3/2015 | Mese | G06F 3/1446 345/1.3 |
| 2019/0212779 A1 | 7/2019 | Wang et al. | |

FOREIGN PATENT DOCUMENTS

EP 2680129 B1 4/2021

OTHER PUBLICATIONS

Ohta et al.; "Pinch: An Interface That Relates Applications on Multiple Touch-Screen by 'Pinching' Gesture"; Research Gate; Conference: ACE 2012, Advances in Computer Entertainment; Kathmandu, Nepal; vol. 7624 2012; Nov. 2012; 9 pages; https://www.researchgate.net/publication/261513473_Pinch_An_Interface_That_Relates_Applications_on_Multiple_Touch-Screen_by_%27Pinching%27_Gesture.

* cited by examiner

*Primary Examiner* — Yaron Cohen
(74) *Attorney, Agent, or Firm* — Scott Griggs; Griggs Bergen LLP

(57) ABSTRACT

A system and method for content delivery across a heterogenous multi-display environment are disclosed. In one embodiment of the system, each smart device in the multi-display environment contains a display, a processor, non-transitory memory, and storage, interconnected by a busing architecture. Each device also has a wireless transceiver. The system obtains device characteristics, including display size, display brightness, resolution, device form factor, display orientation, and relative physical positioning, for example. The system divides the content into sections, allocating each to a device based on these characteristics and physical adjacency. Consequently, sections displayed on adjacent devices form contiguous portions of the content. The system synchronizes the rendering of the sections across devices, ensuring a unified and contiguous content display. This system provides an innovative approach to using multiple devices in tandem to display coordinated content, enhancing the viewing experience and promoting effective utilization of multiple screens.

20 Claims, 4 Drawing Sheets

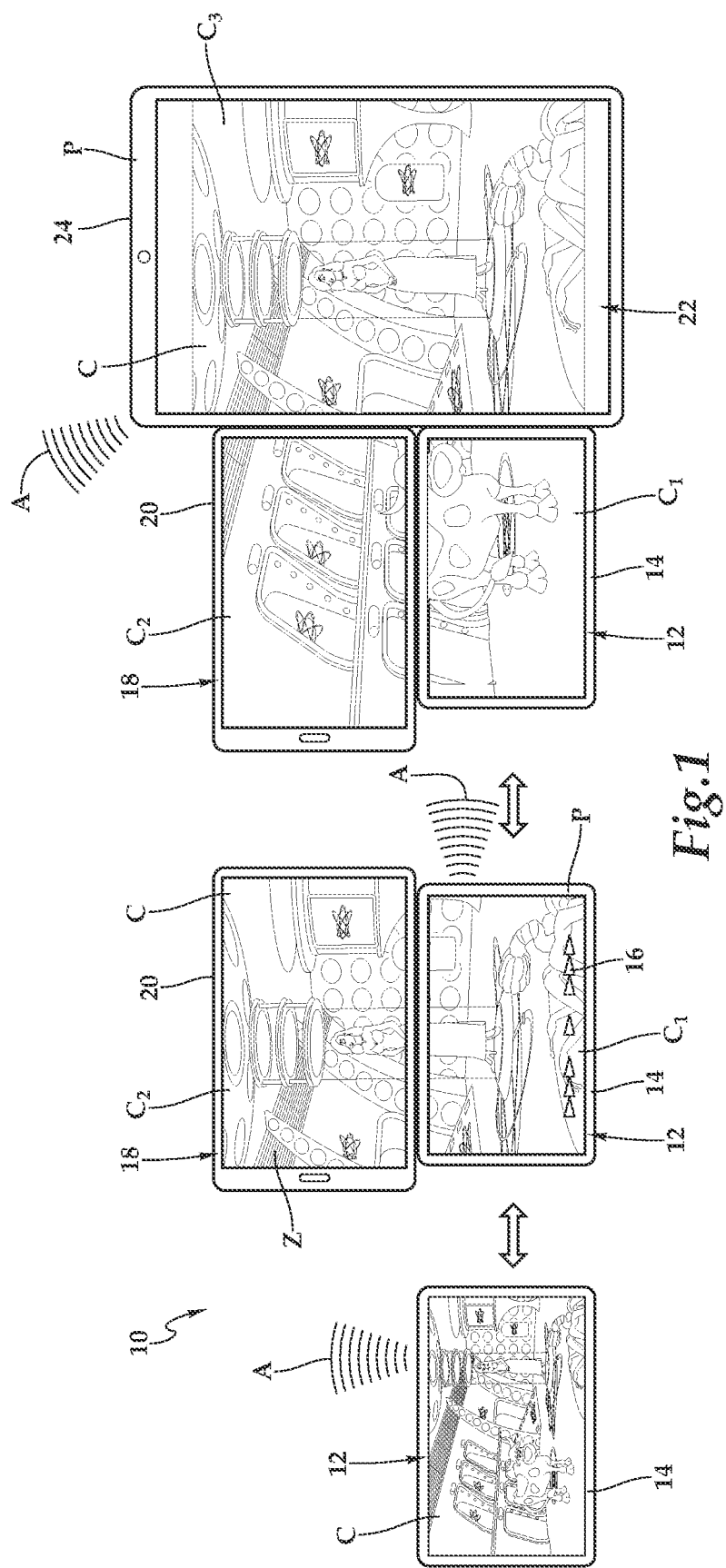

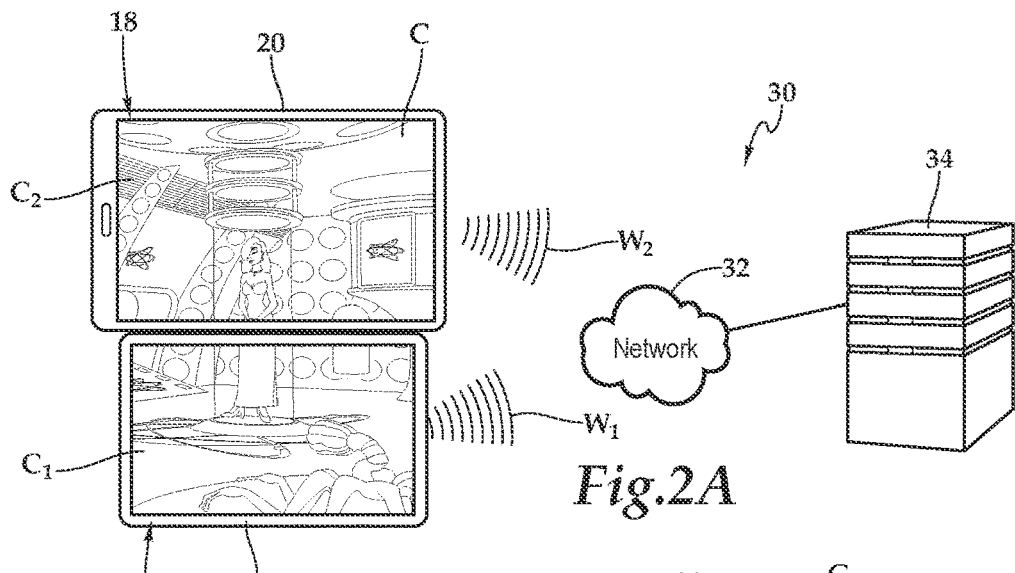
Fig.2A
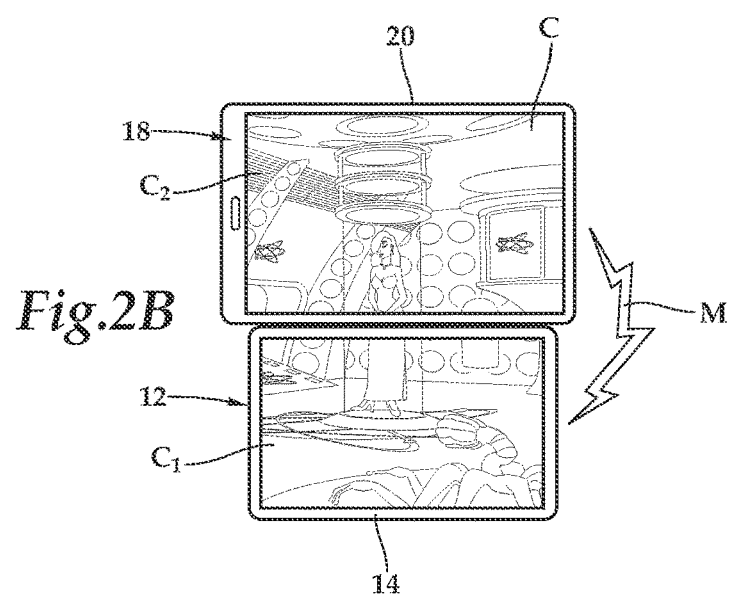
Fig.2B
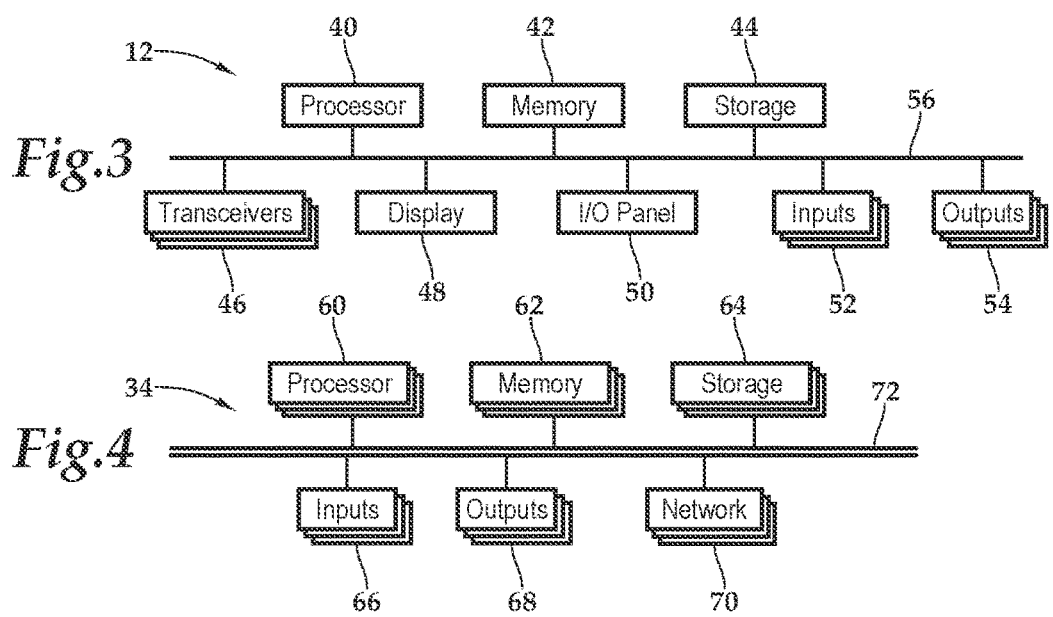
Fig.3
Fig.4

SYSTEM AND METHOD FOR CONTENT DELIVERY ACROSS A HETEROGENEOUS MULTI-DISPLAY ENVIRONMENT

PRIORITY STATEMENT & CROSS-REFERENCE TO RELATED APPLICATIONS

This application claims priority from U.S. Provisional Patent Application No. 63/470,871, entitled "System and Method for Content Delivery Across a Heterogeneous Multi-display Environment" and filed on Jun. 3, 2023, in the name of Chirag Gupta et al.; which is hereby incorporated by reference, in entirety, for all purposes.

TECHNICAL FIELD OF THE INVENTION

This invention relates, in general, to displays on smart devices and, in particular, to systems and methods for content delivery across a heterogeneous multi-display environment having multiple smart devices.

BACKGROUND OF THE INVENTION

Digital devices such as smartphones and tablets have become omnipresent tools in everyday life, serving various functions from communication to entertainment and productivity. These devices each possess their individual display screens, which are often too small to provide a suitable view of content. Traditional solutions for viewing content on these devices are limited by the device's screen size, and this restriction often compromises the user experience, particularly when viewing detailed or expansive content that would benefit from a larger display area.

Existing approaches to address this issue, such as using a device with a larger screen, do not fully provide sufficient solutions. Therefore, there exists a need for an enhanced system and method that effectively manages and coordinates content display.

SUMMARY OF THE INVENTION

It would be advantageous to provide an enhanced system and method that effectively manages and coordinates content display. It would also be desirable to provide a computer-based solution that is easily and reliably deployed in a heterogenous multi-display environment. To better address one or more of these concerns, a system and method for content delivery across a multi-display environment and a heterogenous multi-display environment are disclosed. In one embodiment of the system, each smart device in the multi-display environment contains a display, a processor, non-transitory memory, and storage, interconnected by a busing architecture. Each device also has a wireless transceiver. The system obtains device characteristics, including display size, display brightness, resolution, device form factor, display orientation, and relative physical positioning. The system divides the content into sections, allocating each to a device based on these characteristics and physical adjacency. Consequently, sections displayed on adjacent devices form contiguous portions of the content. The system synchronizes the rendering of the sections across devices, ensuring a unified and contiguous content display. This system provides an innovative approach to using multiple devices in tandem to display coordinated content, enhancing the viewing experience and promoting effective utilization of multiple screens. This system as well as the method and other aspects of the invention will be apparent from and elucidated with reference to the embodiments described hereinafter.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which:

FIG. 1 is a detailed schematic diagram of one embodiment of a system for content delivery across a heterogeneous multi-display environment having multiple smart devices, according to the teachings presented herein;

FIG. 2A is a detailed schematic diagram of the system in FIG. 1 utilizing a network-based operational configuration;

FIG. 2B is a detailed schematic diagram of the system in FIG. 1 utilizing a mesh-based operational configuration;

FIG. 3 is a functional block diagram of one embodiment of a smart device;

FIG. 4 is a functional block diagram of one embodiment of a server, which may be utilized with the system;

DETAILED DESCRIPTION OF THE INVENTION

Figure 5:
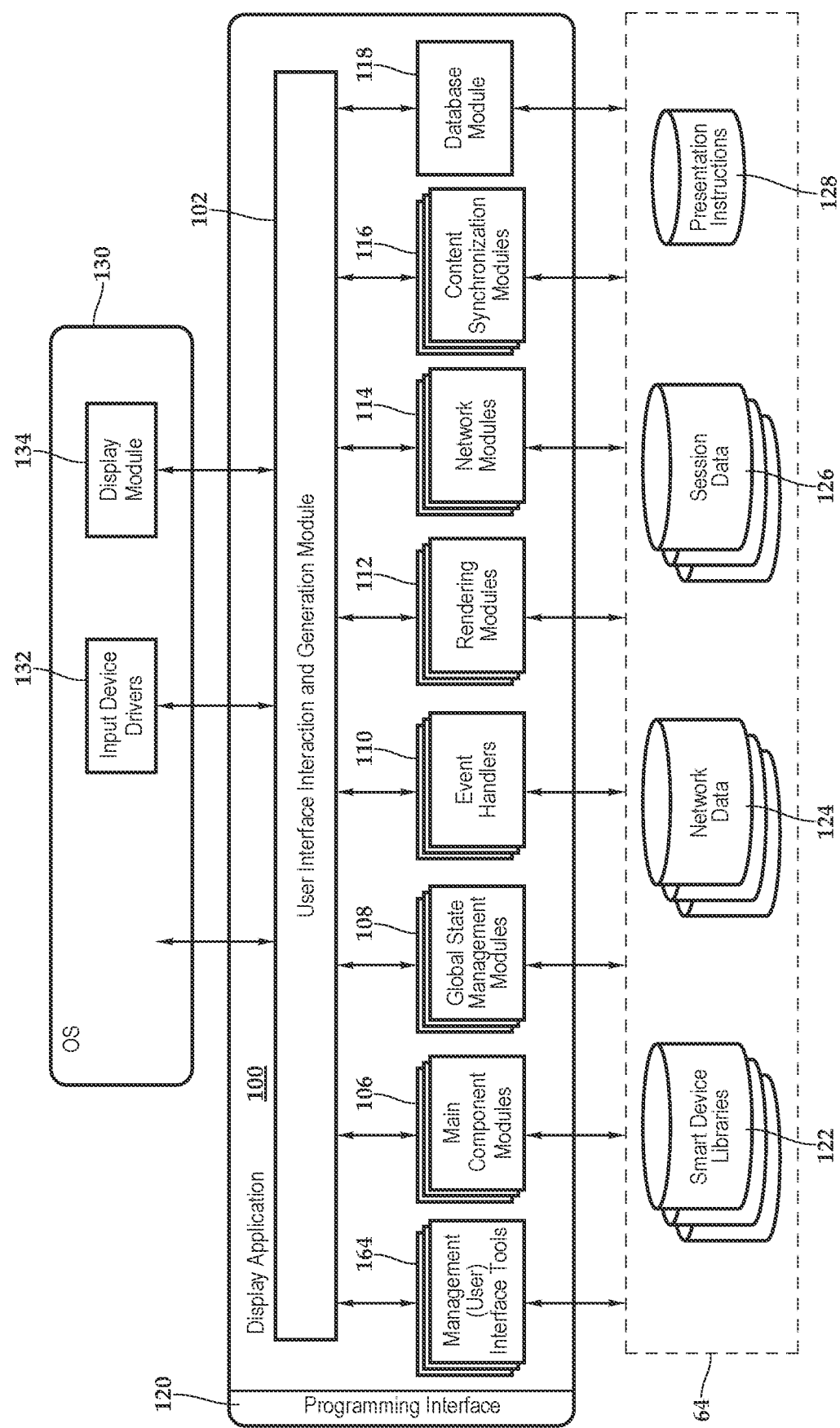
FIG. 5 is a conceptual module diagram depicting a software architecture of a display application of some embodiments.

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of several specific ways to make and use the invention, and do not delimit the scope of the present invention.

Referring initially to FIG. 1, therein is depicted one embodiment of a system, which delivers content across a heterogeneous multi-display environment having multiple smart devices, that is schematically illustrated and generally labeled 10. This system facilitates the dynamic and seamless coordination of content rendering across multiple smart devices to establish a unified, multi-display environment. Starting with a smart device 12, which has a set of attributes 14 associated with therewith, including, for example, display size, display brightness, display resolution, form factor (for instance, whether a smartphone, a tablet, or a wearable device, for example, including manufacturer and model), display orientation (e.g., portrait or landscape), and relative physical positioning with respect to other smart devices. When the smart device 12 is introduced to the system 10, content C, which may be images, videos, or interactive multimedia content, including video games, diagnostic medical images, and professional business documents, for example, is fully displayed on the smart device 12. More-over, if content C has an audio component, audio A, the smart device 12 will render the audio as well.

When a smart device 18 is added to the system 10, the system 10 identifies and records the attributes 20 of this device, similar to those recorded for the smart device 12. Based on the attributes and physical adjacency of the smart devices 12 and 18, the system 10 partitions the original content C into two parts: content $C_1$ for the smart device 12 and content $C_2$ for the smart device 18. The partitioning process is carried out such that when the content $C_1$, $C_2$ are respectively displayed on the smart devices 12, 18, which combine to form a continuous and unified visual representation of the content C. The system 10 also ensures that the rendering of the content $C_1$, $C_2$ is synchronized across the two smart devices 12, 18. Depending on the system configuration, either one device (for instance, the smart device 12) or both devices might be designated to render the audio A. As shown, the smart device 12 is designated the primary device P and the smart device 12 is rendering the audio A as well as displaying controls 16, which are utilized to fast forward the content C as well as zoom Z in on the content C.

When a third smart device 22 is added, with its own attributes 24, the system 10 performs a similar process. The system 10 records the attributes 24 of the smart device 22 and then repartitions the content again, creating sections of content $C_1$, $C_2$, and $C_3$ for devices 12, 18, and 22 respectively. These sections are allocated in a way that they combine to form a unified and contiguous display of content C when rendered on the respective smart devices 12, 18, 22. The rendering of these content sections $C_1$, $C_2$, $C_3$ is synchronized across all three smart devices 12, 18, 22, and the audio A can be rendered by one or more of the smart devices 12, 18, 22 as configured by the system 10. As shown, the smart device 22 is the primary device P that is providing audio A. It should be appreciated that this display process may be repeated as additional devices are added or existing devices are removed, creating a flexible and scalable multi-display environment where content can be seamlessly shared and displayed across a variety of smart devices, despite their homogeneity or heterogeneity.

Referring now to FIG. 2A, the smart devices 12, 18 are connected wirelessly over a network 32 to a server 34. In this configuration, both smart devices 12, 18 are depicted as being in direct communication with the server 34 through the wireless network 32. This may be a local area network (LAN) or a wide area network (WAN), including the Internet. The server 34 plays a pivotal role in this setup, acting as a primary controller to manage the communication, content distribution, and synchronization of the rendering of content C on the smart devices 12, 18 as content $C_1$, $C_2$. As per the representation, the smart devices 12 and 18 send the respective attributes 14, 20 and relative positions to the server 34. In return, the server 34 coordinates the partitioning of the content C and allocation of content sections as content $C_1$, $C_2$ to each of the smart devices 12, 18. The server 34 also ensures that the rendering of the content $C_1$, $C_2$ on the respective smart devices 12, 18 is synchronized to create a unified and continuous display of the content across devices 12 and 18. FIG. 2B, on the other hand, represents a slightly different setup where smart devices 12 and 18 are connected in a mesh network M. In the mesh network M, each of the smart device 12, 18 is directly connected to every other device, without a need for a central server or controller. In this configuration, the smart devices 12 and 18 can communicate with each other directly, exchanging information about the attributes 14, 20 and relative positioning. The smart devices 12, 18 may work collaboratively to partition the content, allocate content sections, and synchronize the rendering of these sections, thus creating a unified and continuous display of the content. Alternatively, one of the smart devices 12, 18 may be designated to allocate content sections, and synchronize the rendering of these sections, thus creating a unified and continuous display of the content. While both setups in FIG. 2A and FIG. 2B facilitate a multi-display environment, the choice between the two could depend on factors such as the availability and reliability of a network connection, the number and capabilities of the smart devices, and specific requirements of the use case.

Referring now to FIG. 3, the smart device 12 may be a wireless communication device of the type including various fixed, mobile, and/or portable devices. To expand rather than limit the discussion of the smart device 12, such devices may include, but are not limited to, cellular or mobile smart phones, tablet computers, and smartwatches, and so forth. Further, it should be appreciated that while FIG. 3 depicts the smart device 12, the structure and functionality of the smart devices 18, 22 may be similar and, as mentioned, the number of smart devices employed in the systems and methodologies presented herein is not limited. The smart device 12 may include a processor 40, memory 42, storage 44, multiple transceivers 46, a display 48, an I/O panel 50, inputs 52, and outputs 54 interconnected by a busing architecture 56. It should be appreciated that although a particular architecture is explained, other designs and layouts are within the teachings presented herein.

The processor 40 may process instructions for execution within the smart device 12, including instructions stored in the memory 42 or in storage 44. The memory 42 stores information within the smart device, as a computing device. In one implementation, the memory 42 is a volatile memory unit or units. In another implementation, the memory 42 is a non-volatile or non-transitory memory unit or units. The storage 44 includes capacity that is capable of providing mass storage for the smart device 12, including simulated environment database storage capacity. The transceivers 46 are units that can both transmit and receive signals. These signals could be data, voice, video, or other types of communication signals. In the context of the smart device 12, a transceiver is usually responsible for managing wireless communications, such as Wi-Fi or cellular data, by sending and receiving data packets. The display 48 of a smart device 12 is an output component that presents information in visual form. Typically, the display 48 will be a liquid-crystal display (LCD) or an organic light-emitting diode (OLED) screen in modern smart devices, such as smartphones and tablets. Display size, resolution, and technology may vary depending on the type and model of the smart device. The I/O (Input/Output) panel 50 of the smart device 12 includes various ports and physical buttons that allow the user to interact with the device and connect it to other devices. This can include touchscreens, physical or virtual keyboards, microphones for voice input, speakers for audio output, charging ports, and data ports (like USB ports), among others. The I/O panel 50 allows the device to receive inputs from the user (or other devices) and provide outputs to the user (or other devices). The transceivers 46 may provide wireless interfaces for the I/O panel 50 in the form of Bluetooth, Wi-Fi, and other similar protocols for exchanging data. Various inputs 130 and outputs 132 provide connections to and from the smart device 12, wherein the inputs 130 are the signals or data received by the smart device 12, and the outputs 132 are the signals or data sent from the smart device 12.

In operation, the teachings presented herein permit the smart device 12, such as a smartphone, to form a networked or meshed-based communication with other smart devices and then operationally influence the delivery of content on the displays of the smart devices. As shown, the smart device 12 includes the memory 42 accessible to the processor 40 and the memory 42 includes processor-executable instructions that, when executed by the processor, cause the system to execute a series of operations. These operations may include to ascertain attributes pertinent to each of the smart devices. As previously discussed, the attributes may include, by way of example, a size of the display, a resolution of the display, a form factor of the smart device, an orientation of the display, and relative physical positioning with respect to the plurality of smart devices.

The processor-executable instructions, when executed by the processor, then cause the system to partition a visual portion of content into multiple sections based on the identified attributes and physical adjacency of each of the smart devices. The visual portion of the content may be partitioned such that each smart device displays a unique portion of the content, with no portion being displayed on more than one device. Next, each section of the visual portion of the content is caused to be allocated to a respective smart device of the plurality of smart devices, such that, in some embodiments, the sections displayed on physically adjacent devices combine to form contiguous portions of the content. The processor-executable instructions, when executed by the processor, then cause the system to synchronize rendering of the respective sections of the visual portion of the content across the plurality of smart devices, ensuring that each smart device displays its assigned section at the appropriate time, thereby creating a unified and contiguous content display across the plurality of smart devices.

In some embodiments, the smart device 12 includes the memory 42 accessible to the processor 40 and the memory 42 includes additional processor-executable instructions that, when executed by the processor, cause the system to designate a single device of the smart devices to render an audio portion of content or to designate multiple devices of the smart devices to render an audio portion of content. Similarly, additional processor-executable instructions that, when executed by the processor, may designate a single device of the smart devices to render content controls or designate multiple devices of the plurality of the smart devices to render content controls.

In some embodiments, further processor-executable instructions are associated with the memory 42 that, when executed by the processor 40, cause the system 10 to connect the smart devices over a wireless network, which may be the Internet. The connection over the wireless network may enable communication with a server. In other embodiments, additional processor-executable instructions connect the plurality of smart devices via a mesh network. Further still, the processor-executable instructions may cause a single device to be selected of the smart devices as a primary device.

Referring now to FIG. 4, one embodiment of a server 34, which may be a cloud server, as a computing device includes, within a housing, a processor 60, memory 62, storage 64, inputs 66, outputs 68, and network interfaces 70 interconnected with various buses 72 in a common or distributed, for example, mounting architecture. In other implementations, in the computing device, multiple processors and/or multiple buses may be used, as appropriate, along with multiple memories and types of memory. Further still, in other implementations, multiple computing devices may be provided and operations distributed therebetween. The processor 60 may process instructions for execution within the server 34, including instructions stored in the memory 62 or in the storage 64. The memory 62 stores information within the computing device. In one implementation, the memory 62 is a volatile memory unit or units. In another implementation, the memory 62 is a non-volatile or non-transitory memory unit or units. The storage 64 includes capacity that is capable of providing mass storage for the server 34, including simulated environment database storage capacity. Various inputs 66 and outputs 68 provide connections to and from the server 34, wherein the inputs 66 are the signals or data received by the server 34, and the outputs 68 are the signals or data sent from the server 34. The network interfaces 70 provide the necessary device controller or controllers to connect the server 34 to one or more networks, such as the Internet, for example.

The memory 62 is accessible to the processor 60 and includes processor-executable instructions that, when executed, cause the processor 60 to execute a series of operations. In some embodiments, the processor-executable instructions cause the system 10 to connect the smart devices over a wireless network, which may be the Internet. The connection over the wireless network may enable communication with a server, and the server, via a programming interface, may execute a portion of the processor-executable instructions presented in FIG. 3. That is, it should be appreciated that the processor-executable instructions presented in FIG. 3 may be distributed between the smart device 12 and the server 34, which, as mentioned, may be a cloud-based server.

The processor-executable instructions presented hereinabove with FIGS. 3 and 4 include, for example, instructions and data which cause a general purpose computer, special purpose computer, or special purpose processing device to perform a certain function or group of functions. Processor-executable instructions also include program modules that are executed by computers in stand-alone or network environments. Generally, program modules include routines, programs, components, data structures, objects, and the functions inherent in the design of special-purpose processors, or the like, that perform particular tasks or implement particular abstract data types. Processor-executable instructions, associated data structures, and program modules represent examples of the program code means for executing steps of the systems and methods disclosed herein. The particular sequence of such executable instructions or associated data structures represents examples of corresponding acts for implementing the functions described in such steps and variations in the combinations of processor-executable instructions and sequencing are within the teachings presented herein.

FIG. 5 conceptually illustrates the software architecture of a display application 100 of some embodiments that may be utilized to delivery content with respect the smart devices 12, 18, 22, for example. In some embodiments, the display application 100 is a stand-alone application or is integrated into another application, while in other embodiments the application might be implemented within an operating system 130. Furthermore, in some embodiments, the display application 100 is provided as part of a server-based solution or a cloud-based solution. In some such embodiments, the application is provided via a thin client. That is, the application runs on a server while a user interacts with the application via a separate machine remote from the server. In other such embodiments, the application is provided via a thick client. That is, the application is distributed from the server 34 to the client machine (e.g., smart device 12) and runs on the client machine.

The display application 100 includes a user interface (UI) interaction and generation module 102, management (user) interface tools 104, main component modules 106, global state management modules 108, event handlers 110, rendering modules 112, network modules 114, content synchronization modules 116, and a database module 118, which are supported by a programming interface 120. The management interface tools 104 provide the users with the capability to manage and configure the multi-display environment. It may include features for adding or removing devices, adjusting the layout or synchronization settings, and other administrative functions. The main component modules 106 are the core modules that perform the main functions of the display application. This may include, by way of example, tasks like processing the content to be displayed, controlling the operation of the smart devices, and managing the multi-display environment.

The global state management modules 108 manage the overall state of the display application 100 across all smart devices and server, if applicable. By way of example, this may involve tracking which devices are part of the multi-display environment, what content each device is displaying, and the synchronization status of the devices. The event handlers 110 handle events that occur within the display application 100, such as user interactions, changes in the multi-display environment (like a device being added or removed), and updates to the content. The event handlers 100 respond to these events and trigger the appropriate actions in the application. The rendering modules 112 are responsible for generating the visual output that is displayed on the smart devices. The rendering modules 112 take the processed content and convert it into a format that can be displayed on a particular smart device's display. This may involve tasks like layout calculation, graphics rendering, and animation, for example.

The network modules 114 manage the network connections between the smart devices, whether via the Internet or a mesh network, for example. They handle tasks like establishing and maintaining connections, transmitting data between devices, and managing network security. The content synchronization modules 116 ensure that the content displayed across the multiple smart devices is synchronized. The network modules 114 manage the timing and sequence of content display to ensure that the separate sections of content displayed on different devices form a unified and contiguous whole. This may involve, by way of example, tasks like partitioning the content, allocating content sections to devices, and coordinating the rendering of content across devices. In some embodiments, the programming interface 120 provides a set of rules or protocols that specifies how software components should interact with one another as well as enabling interaction between different software applications, or between different parts of the same application, or, via software, between different computing devices.

The display application 100, via the display module 118, has access to the storage 64, which in one embodiment, may include smart device libraries 122, network data 124, session data 126, and presentation instructions 128. In some embodiments, storages 122, 124, 126, 128 are all stored in one physical storage. In other embodiments, the storages 122, 124, 126, 128 are in separate physical storages, or one of the storages is in one physical storage while the other is in a different physical storage.

The various storages, in one implementation, provide a database of all pertinent information required for operation. The smart device libraries 122 include pre-written code, classes, procedures, scripts, configuration data (including attribute data), and more, tailored specifically for smart devices. The smart device libraries 122 aid in deployment of software by providing data and routine. The smart device libraries 122 include functions for managing the device's hardware, such as the display, sensors, or wireless communication capabilities. The network data 124 provides the data to support the wireless configuration or mesh configuration to enable data to be sent or received within the system. This may include, for example, data about network configuration and the network connection itself such as connection status, speed, latency, or security information. The session data 126 may be specific to each usage or session of the display application 100. It may include data about user preferences, user inputs, current state of the application, history of actions taken during the current session, and any temporary data that needs to be stored between different parts of the display application 100 or between different stages of the same operation. This data may be used to provide a more personalized user experience and make the display application 100 more efficient and effective. The presentation instructions 128 guide how the content is displayed on the smart devices. This may include details on layout, formatting, animation, transition between different content sections, and any other visual effects. The presentation instructions 128 are used by the rendering modules 112 to generate the visual output that is presented to the user on each of the smart devices' display.

The UI interaction and generation module 102 generates a user interface that allows the end user to interact with the display application 100. In the illustrated embodiment, FIG. 5 also includes the operating system 130 that includes input device driver(s) 132 and a display module 134. In some embodiments, as illustrated, the input device drivers 132 and display module 134 are part of the operating system 130 even when the display application 100 is an application separate from the operating system 130. The input device drivers 132 may include drivers for translating signals from a keyboard, mouse, touchpad, tablet, touch screen, gyroscope or accelerometer, for example. A user may use one or more of these input devices 132, which send signals to their corresponding device driver, in combination with the display module 134 to interact with the display application 100. The device driver then translates the signals into user input data that is provided to the UI interaction and generation module 102.

Figure 6:
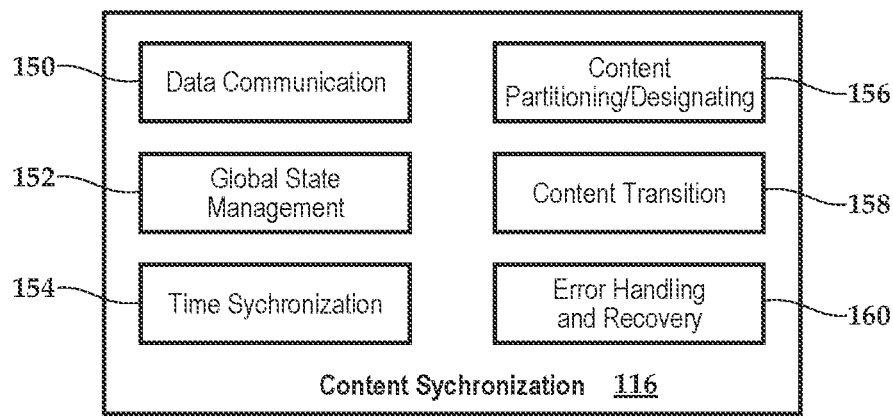
FIG. 6 is a conceptual module diagram depicting a content synchronization module of the display application of some embodiments.

Referring now to FIG. 6, content synchronization, in the context of the multi-screen display system described here, may be the process by which content (e.g., images, video, text, etc.) is simultaneously displayed across multiple devices in a coordinated and cohesive manner. Achieving content synchronization via the content synchronization modules 116 may involve several submodules, including data communication submodule 150, global state management submodule 152, time synchronization submodule 154, content partitioning/designating submodule 156, content transition submodule 158, and error handling and recovery submodule 160.

With respect to the data communication submodule 150, the first step in achieving content synchronization is establishing a reliable data communication protocol between all smart devices and the server, if applicable, involved. The data communication submodule 150 interfaces with the network modules 114 such that this can be achieved through various networking technologies such as WiFi, Bluetooth, or Internet-based connections, for example, that enable the aforementioned network configuration (FIG. 2A) or the mesh configuration (FIG. 2b). The global state management submodule 152 interfaces with the global state management modules 108 to track the current state of the application across all smart devices. When a change occurs on one smart device, such as the display of a new image or video, the global state management submodule 152 updates accordingly and communicates this change to all other smart devices.

The time synchronization submodule 154 ensures that the content is displayed simultaneously on all smart devices by ensuring operations on the same timeline. This may involve the use of a common time reference or a synchronization protocol, such as the Network Time Protocol (NTP), to ensure all smart devices display changes at the exact same time. The content partitioning/designating submodule 156 determines how to divide it among the multiple screens of the respective multiple devices. In a network configuration, the server may make this decision. In a mesh network configuration, the primary smart device may make this decision and communicate the relevant portion of the content each smart device should display. The decision may be based on several factors, including the number of devices, their screen size, and orientation.

The content transmission submodule 158 assists in the process by transmitting designated portions of the content to each smart device, following the determination of the specific sections each smart device is tasked with displaying. Again, this can be done either by the server or the primary smart device. The error handling and recovery submodule 160 provides further functionality. If a smart device fails to display its portion of the content, or if a new device is added, the system needs to be able to handle this change. In some embodiments, the error handling and recovery submodule 160 provides redistributing of the content among the remaining or new devices and updating the global state accordingly.

Figure 7:
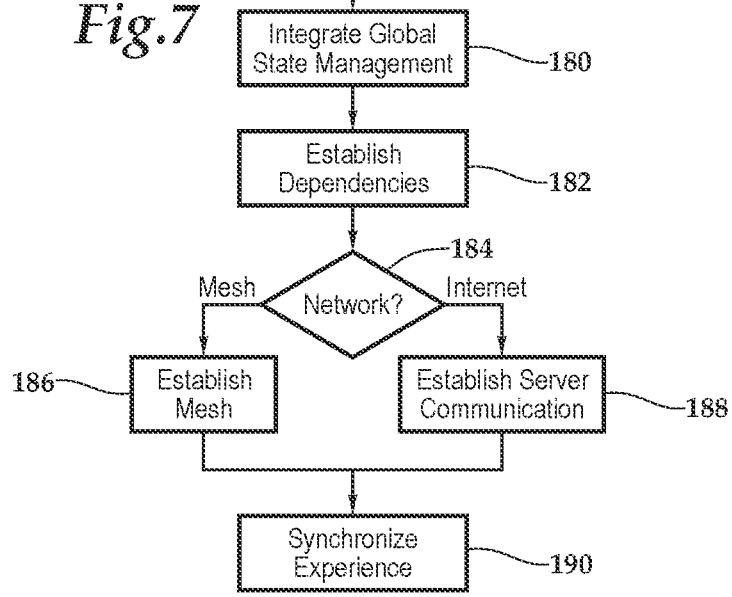
FIG. 7 is a flow chart showing one embodiment of a method for content delivery across a heterogeneous multi-display environment having multiple smart devices, according to teachings presented herein.

Referring now to FIG. 7, one embodiment of a method for content delivery across a heterogeneous multi-display environment having multiple smart devices is depicted. At block 170, environment setup and dependencies are established. The appropriate coding environment with the necessary libraries and modules that support the application's user interface components, state management capabilities, and network communication features are enabled. At block 172, design and theme are configured by defining, for example, the styles and visual theme configurations within the component to ensure a responsive user interface that adapts based on the screen sizes and orientations of the participating devices. At block 174, the main component is defined such that attributes of the smart device are ascertained. At this step, managing the state of the main component may be handled internally, including the arrangement of screens, synchronization of displayed content across devices, and handling of user interface elements like dropdown menus, for example. At block 176, event handler functions are established that respond to user interactions and update the state of the component, triggering necessary actions such as screen arrangement adjustments and content updates.

At block 178, rendering logic is deployed that generates a structured layout of a menu component with multiple items, each corresponding to a different layout option. At block 180, integration of the global state management system occurs by defining functions that facilitate the integration of each display of each smart device with the global state management system and connecting component-by-component to the system. At block 184, the network is established. Depending on the available resources, a mesh network between the smart devices is setup (block 186) or Internet connectivity is leveraged to synchronize smart devices via a server (block 188). The methodology continues to block 190, where content synchronization occurs. Once all devices are in sync, the image or video displayed on the primary device is resized and displayed across all devices in the network or connected to the server. The system communicates with the other devices or the server to decide which portion of the image each device is going to display.

Figure 8:
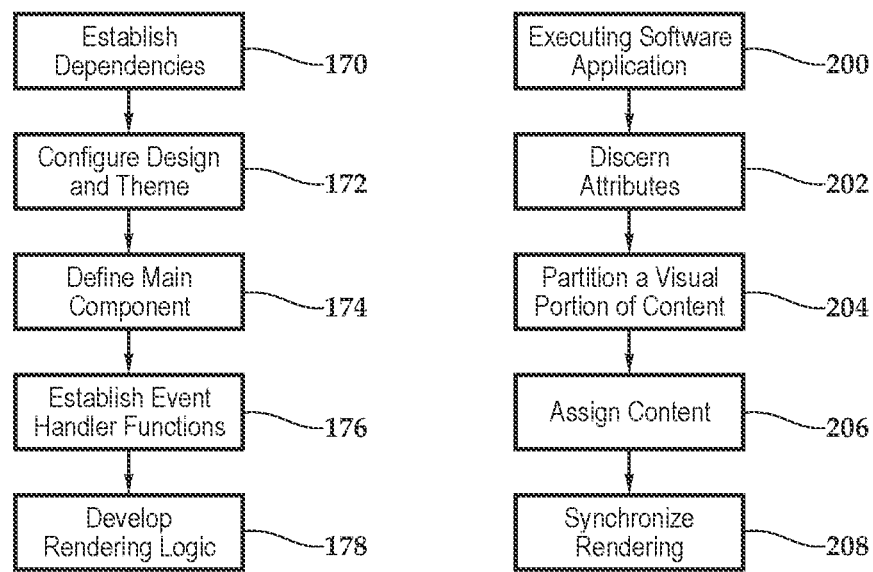
FIG. 8 is a flow chart showing one embodiment of a method for synchronizing an experience.

Referring now to FIG. 8, one embodiment of a method for synchronizing an experience is shown. At block 200, a software application, such as the display application 100 (see FIG. 5), is executed on multiple smart devices, each of which includes a display and other electronic circuitry. In some embodiments, the methodology at block 200 may include a creation of a mesh network between the multiple smart devices. In other embodiments, the methodology at block 200 may include connecting the smart devices over a wireless network in communication with a server. The server will then also execute a portion of the software application.

At block 202, the methodology advances with discerning attributes relevant to each of the smart devices. As previously discussed, the attributes may include a size of the display, a resolution of the display, a form factor of the smart device, an orientation of the display, and relative physical positioning with respect to the smart devices. As also previously discussed, other attributes are within the teachings presented herein. At block 204, a visual portion of content is partitioned into multiple sections based on the discerned attributes and physical adjacency of each of the plurality of smart devices. At block 206, each section of the visual portion of content is assigned to a respective smart device of the multiple smart devices, such that the sections displayed on physically adjacent devices combine to form contiguous portions of the content. At block 208, the respective sections of the visual portion of the content across the plurality of smart devices is rendered in a synchronized fashion to ensure that each smart device displays its assigned section at the appropriate time, thereby creating a unified and contiguous content display across the plurality of smart devices.

The order of execution or performance of the methods and techniques illustrated and described herein is not essential, unless otherwise specified. That is, elements of the methods and techniques may be performed in any order, unless otherwise specified, and that the methods may include more or less elements than those disclosed herein. For example, it is contemplated that executing or performing a particular element before, contemporaneously with, or after another element are all possible sequences of execution.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A system for configuring a multi-display environment, the system comprising:

a programming interface configured to communicate with a plurality of smart devices, each of the plurality of smart devices including a display, a processor, non-transitory memory, and storage therein, each smart device including a busing architecture communicatively interconnecting the display, the processor, the non-transitory memory, and the storage, each smart device also including a wireless transceiver coupled to the busing architecture; and the non-transitory memory accessible to the processor, the non-transitory memory including first processor-executable instructions that, when executed by the processor, cause the system to:

ascertain attributes pertinent to each of the plurality of smart devices, the attributes including a size of the display, a resolution of the display, a form factor of the smart device, an orientation of the display, relative physical positioning with respect to the plurality of smart devices, and audio capabilities, partition a visual portion of content into multiple sections based on the identified attributes and physical adjacency of each of the plurality of smart devices, allocate each section of the visual portion of the content to a respective smart device of the plurality of smart devices, such that the sections displayed on physically adjacent devices combine to form contiguous portions of the content, manage audio based on the identified audio capabilities, the management including designating a single device of the plurality of the smart devices to render an audio portion of the content, the management excluding selection of a random smart device of the plurality of the smart devices to render the audio portion of the content, the management excluding selection of all smart devices of the plurality of the smart devices to render the audio portion of the content, and synchronize rendering of the respective sections of the visual portion of the content across the plurality of smart devices, ensuring that each smart device displays its assigned section at the appropriate time, thereby creating a unified and contiguous content display across the plurality of smart devices.

2. The system as recited in claim 1, wherein the plurality of smart devices further comprises a device configuration selected from the group consisting of heterogenous devices, homogeneous devices, and a combination of homogeneous and heterogeneous devices.

3. The system as recited in claim 1, wherein the plurality of smart devices further comprises at least one smart phone.

4. The system as recited in claim 1, wherein the plurality of smart devices further comprises at least one tablet.

5. The system as recited in claim 1, wherein the plurality of smart devices further comprises at least one wearable.

6. The system as recited in claim 1, further comprising additional processor-executable instructions that, when executed by the processor, designate multiple devices of the plurality of the smart devices to render an audio portion of content, the designation of multiple devices excluding the designation of all smart devices of the plurality of smart devices.

7. The system as recited in claim 1, further comprising additional processor-executable instructions that, when executed by the processor, connect the plurality of smart devices over a wireless network.

8. The system as recited in claim 1, further comprising additional processor-executable instructions that, when executed by the processor, connect the plurality of smart devices over a wireless network in communication with a server, the server, via the programming interface, executing a portion of the processor-executable instructions.

9. The system as recited in claim 1, further comprising additional processor-executable instructions that, when executed by the processor, connect the plurality of smart devices via the Internet.

10. The system as recited in claim 1, further comprising additional processor-executable instructions that, when executed by the processor, connect the plurality of smart devices via a mesh network.

11. The system as recited in claim 10, further comprising additional processor-executable instructions that, when executed by the processor, select a single device of the plurality of the smart devices as a primary device.

12. The system as recited in claim 1, further comprising additional processor-executable instructions that, when executed by the processor, designate a single device of the plurality of the smart devices to render content controls.

13. The system as recited in claim 1, further comprising additional processor-executable instructions that, when executed by the processor, designate multiple devices of the plurality of the smart devices to render content controls.

14. The system as recited in claim 1, wherein the content is selected from the group consisting of images, multimedia content, and interactive multimedia content.

15. A system for configuring a multi-display environment, the system comprising:

a programming interface configured to communicate with a plurality of smart devices, each of the plurality of smart devices including a display, a processor, non-transitory memory, and storage therein, each smart device including a busing architecture communicatively interconnecting the display, the processor, the non-transitory memory, and the storage, each smart device also including a wireless transceiver coupled to the busing architecture; and the non-transitory memory accessible to the processor, the non-transitory memory including first processor-executable instructions that, when executed by the processor, cause the system to:

ascertain attributes pertinent to each of the plurality of smart devices, the attributes including a size of the display, a resolution of the display, a form factor of the smart device, an orientation of the display, relative physical positioning with respect to the plurality of smart devices, and audio capabilities, partition a visual portion of content into multiple sections based on the identified attributes and physical adjacency of each of the plurality of smart devices, wherein the visual portion of the content is partitioned such that each smart device displays a unique portion of the content, with no portion being displayed on more than one device, allocate each section of the visual portion of the content to a respective smart device of the plurality of smart devices, such that the sections displayed on physically adjacent devices combine to form contiguous portions of the content, manage audio based on the identified audio capabilities, the management including designating a single device of the plurality of the smart devices to render an audio portion of the content, the management excluding selection of a random smart device of the plurality of the smart devices to render the audio portion of the content, the management excluding selection of all smart devices of the plurality of the smart devices to render the audio portion of the content, manage content controls by designating a single device of the plurality of smart devices to display controls that provide for a user to configure the audio and visual content, and synchronize rendering of the respective sections of the visual portion of the content across the plurality of smart devices, ensuring that each smart device displays its assigned section at the appropriate time, thereby creating a unified and contiguous content display across the plurality of smart devices.

16. The system as recited in claim 15, further comprising additional processor-executable instructions that, when executed by the processor, connect the plurality of smart devices over a wireless network in communication with a server, the server, via the programming interface, executing a portion of the processor-executable instructions.

17. The system as recited in claim 15, further comprising additional processor-executable instructions that, when executed by the processor, designate multiple devices of the plurality of the smart devices to render an audio portion of content, the designation of multiple devices excluding the designation of all smart devices of the plurality of smart devices.

18. A method for configuring a multi-display environment, the method comprising:

executing a software application on a plurality of smart devices, each of the plurality of smart devices including a display, a processor, non-transitory memory, and storage therein, each smart device including a busing architecture communicatively interconnecting the display, the processor, the non-transitory memory, and the storage, each smart device also including a wireless transceiver coupled to the busing architecture; and using the processor of each smart device to:

discern attributes relevant to each of the plurality of smart devices, the attributes including a size of the display, brightness of the display, a resolution of the display, a form factor of the smart device, an orientation of the display, relative physical positioning with respect to the plurality of smart devices, and audio capabilities, partition a visual portion of content into multiple sections based on the discerned attributes and physical adjacency of each of the plurality of smart devices, assign each section of the visual portion of content to a respective smart device of the plurality of smart devices, such that the sections displayed on physically adjacent devices combine to form contiguous portions of the content, manage audio based on the identified audio capabilities, the management including designating a single device of the plurality of the smart devices to render an audio portion of the content, the management excluding selection of a random smart device of the plurality of the smart devices to render the audio portion of the content, the management excluding selection of all smart devices of the plurality of the smart devices to render the audio portion of the content, manage content controls by designating a single device of the plurality of smart devices to display controls that provide for a user to configure the audio and visual content, and synchronize rendering of the respective sections of the visual portion of the content across the plurality of smart devices, ensuring that each smart device displays its assigned section at the appropriate time, thereby creating a unified and contiguous content display across the plurality of smart devices.

19. The method as recited in claim 18, further comprising connecting the plurality of smart devices over a wireless network in communication with a server, the server executing a portion of the software application.

20. The method as recited in claim 18, further comprising using the processor of each smart device to designate multiple devices of the plurality of the smart devices to render an audio portion of content, the designation of multiple devices excluding the designation of all smart devices of the plurality of smart devices.

* * * * *